United States Patent
Ranz et al.

(10) Patent No.: US 10,391,469 B2
(45) Date of Patent: Aug. 27, 2019

(54) SORBENT SYSTEMS AND METHODS

(71) Applicant: HAMILTON SUNDSTRAND CORPORATION, Charlotte, NC (US)

(72) Inventors: Holden T. Ranz, West Hartford, CT (US); Timothy A. Nalette, West Stafford, CT (US); Ping Yu, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 106 days.

(21) Appl. No.: 15/345,850

(22) Filed: Nov. 8, 2016

(65) Prior Publication Data

US 2018/0126358 A1 May 10, 2018

(51) Int. Cl.
*B01D 53/02* (2006.01)
*B01J 20/20* (2006.01)
(Continued)

(52) U.S. Cl.
CPC .............. *B01J 20/20* (2013.01); *B01D 53/02* (2013.01); *B01D 53/0407* (2013.01); *B01D 53/26* (2013.01); *B01D 53/58* (2013.01); *B01D 53/82* (2013.01); *B01J 20/0244* (2013.01); *B01J 20/08* (2013.01); *B01J 20/261* (2013.01); *B01J 20/28052* (2013.01); *B01J 20/321* (2013.01); *B01J 20/3204* (2013.01); *B01J 20/3208* (2013.01); *B01J 20/3234* (2013.01); *B01J 20/3236* (2013.01); *B01J 20/3246* (2013.01); *B01D 2253/102* (2013.01);
(Continued)

(58) Field of Classification Search
CPC ........ B01D 2253/102; B01D 2253/104; B01D 2253/112; B01D 2253/202; B01D 2253/25; B01D 2257/406; B01D 2257/80; B01D 2259/40001; B01D 53/0407; B01D 53/26; B01J 20/0244; B01J 20/08; B01J 20/20; B01J 20/261; B01J 20/3204; B01J 20/3208; B01J 20/3234; B01J 20/3236
See application file for complete search history.

(56) References Cited

U.S. PATENT DOCUMENTS 3,531,246 A 9/1970 Matsen
5,113,856 A 5/1992 van der Smissen
(Continued)

FOREIGN PATENT DOCUMENTS

JP 2002066255 3/2002
KR 101600516 3/2016
(Continued)

OTHER PUBLICATIONS

EP Search Report dated Feb. 9, 2018 in EP Application No. 17198352.1.
(Continued)

*Primary Examiner* — Christopher P Jones
(74) *Attorney, Agent, or Firm* — Snell & Wilmer, L.L.P.

(57) ABSTRACT

A sorbent bed may comprise a sorbent support comprising at least one of a carbon material, a polymeric material, or alumina, wherein the sorbent support comprises a plurality of pores; and an impregnant configured to absorb ammonia disposed within the plurality of pores in the sorbent support, wherein the sorbent bed comprises between 20% and 60% by weight impregnant.

13 Claims, 3 Drawing Sheets

(51) Int. Cl.
  *B01D 53/04* (2006.01)
  *B01D 53/26* (2006.01)
  *B01J 20/02* (2006.01)
  *B01J 20/08* (2006.01)
  *B01J 20/26* (2006.01)
  *B01J 20/32* (2006.01)
  *B01D 53/58* (2006.01)
  *B01D 53/82* (2006.01)
  *B01J 20/28* (2006.01)

(52) U.S. Cl.
  CPC .. *B01D 2253/104* (2013.01); *B01D 2253/112* (2013.01); *B01D 2253/202* (2013.01); *B01D 2253/25* (2013.01); *B01D 2257/406* (2013.01); *B01D 2257/80* (2013.01); *B01D 2258/06* (2013.01); *B01D 2259/40001* (2013.01); *B01D 2259/4566* (2013.01); *B01D 2259/4575* (2013.01); *B01J 2220/56* (2013.01); *Y02A 50/2346* (2018.01)

(56) References Cited

U.S. PATENT DOCUMENTS

| | | | |
|---|---|---|---|
| 6,755,892 | B2 | 6/2004 | Nalette |
| 9,073,039 | B2 | 7/2015 | Wojtowicz et al. |
| 2009/0211453 | A1* | 8/2009 | Nassivera ............. B01D 53/58 96/153 |
| 2011/0308524 | A1 | 12/2011 | Brey et al. |
| 2013/0160652 | A1* | 6/2013 | Yuasa ................. B01D 53/261 96/153 |

FOREIGN PATENT DOCUMENTS

| | | |
|---|---|---|
| WO | 02084099 | 10/2002 |
| WO | 2012100110 | 7/2012 |

OTHER PUBLICATIONS

European Patent Office, European Search Report dated May 17, 2018 in Application No. 17198352.1-1104.

* cited by examiner

SORBENT SYSTEMS AND METHODS

FIELD

This disclosure relates to systems and methods for a sorbent.

BACKGROUND

In closed-loop life support systems, trace contaminants in breathable air supply, such as ammonia, may be present as a result of equipment off-gasing and human metabolism. At certain concentrations, ammonia may be toxic to humans if inhaled. Therefore, the removal of ammonia from breathable air supply, especially in enclosed environments such as submarines, space vehicles, or spacesuits, is important to minimize the health risk to occupants.

SUMMARY

In various embodiments, a sorbent bed may comprise a sorbent support comprising at least one of a carbon material, a polymeric material, or alumina, wherein the sorbent support comprises a plurality of pores; and an impregnant configured to absorb ammonia disposed within the plurality of pores in the sorbent support, wherein the sorbent bed comprises between 20% and 60% by weight impregnant. In various embodiments, the impregnant may be at least one of phosphoric acid or a metal salt. The metal salt may be zinc chloride. In various embodiments, the sorbent bed may comprise between 30% and 60% by weight impregnant. In various embodiments, the polymeric material may be polymethyl methacrylate. In various embodiments, the sorbent bed may further comprise a retention element upon which the sorbent support is disposed.

In various embodiments, a ventilation system may comprise a dehumidifier; and a sorbent system downstream of the dehumidifier, the sorbent system comprising a sorbent housing and a sorbent bed disposed within the sorbent housing. The sorbent housing may comprise an inlet and an outlet for an airflow through the sorbent housing. The sorbent bed may comprise a sorbent support and an impregnant configured to absorb ammonia, the sorbent support comprising at least one of a carbon material, a polymeric material, or alumina, wherein the sorbent support comprises a plurality of pores and the impregnant is disposed within the plurality of pores. The sorbent bed comprises between 20% and 60% by weight impregnant. In various embodiments, relative humidity in the ventilation system around the sorbent system is below 50%. In various embodiments, the impregnant is at least one of phosphoric acid or a metal salt. The metal salt may be zinc chloride. In various embodiments, the sorbent bed may comprise between 30% and 60% by weight impregnant. In various embodiments, the polymeric material may be polymethyl methacrylate. In various embodiments, the sorbent bed may further comprise a retention element upon which the sorbent support is disposed. In various embodiments, the sorbent housing is configured to receive a flowrate between 0.1 and 30 cubic feet per minute.

In various embodiments, a method for making a sorbent system may comprise forming an impregnant solution comprising a solvent and an impregnant configured to absorb ammonia; and forming a sorbent bed by applying the impregnant solution to a sorbent support, infiltrating a plurality of pores comprised in the sorbent support with the impregnant solution, and evaporating the solvent from the impregnant solution applied to the sorbent support leaving the impregnant in the plurality of pores, wherein the sorbent bed comprises between 20% and 60% by weight impregnant after the evaporating the solvent. In various embodiments, the impregnant may be at least one of phosphoric acid or a metal salt. The metal salt may be zinc chloride. In various embodiments, the sorbent bed may comprise between 30% and 60% impregnant after the evaporating the solvent. In various embodiments, the method may further comprise forming the sorbent support by applying support particles to a retention element. In various embodiments, the sorbent support may comprise at least one of a carbon material, a polymeric material, or alumina. In various embodiments, the method may further comprise disposing the sorbent bed into a sorbent housing after evaporating the solvent.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures. In the figures, like referenced numerals may refer to like parts throughout the different figures unless otherwise specified.

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
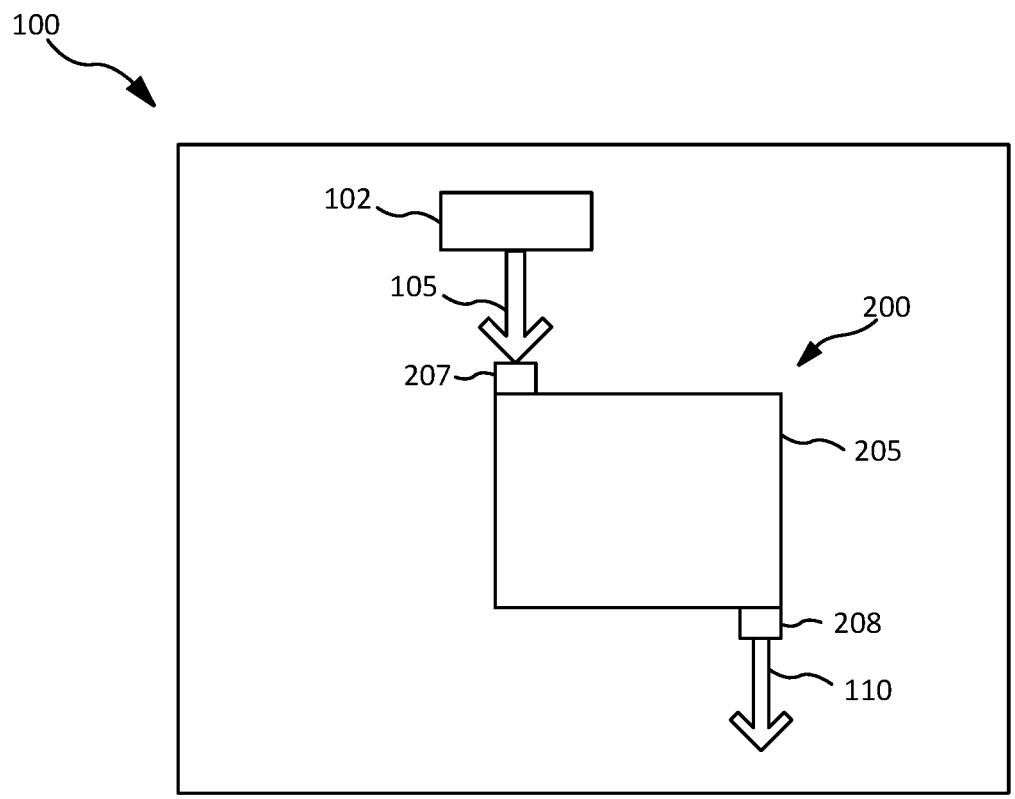
FIG. 1 illustrates a ventilation system, in accordance with various embodiments.

In various embodiments, with reference to FIG. 1, a ventilation system 100 may comprise a dehumidifier 102 and a sorbent system 200 downstream of dehumidifier 102. Sorbent system 200 may comprise a sorbent housing 205, including a housing inlet 207 and a housing outlet 208. The airflow traveling through sorbent system 200 may enter as inlet airflow 105 through housing inlet 207, travel through sorbent housing 205, and exit as outlet airflow 110 through housing outlet 208. Sorbent system 200 may be configured to allow airflow through it to filter and/or remove various contaminants in the airflow such that outlet airflow 110 comprises no contaminants or fewer contaminants or lower concentrations of contaminants than inlet airflow 105. For example, sorbent system 200 may be configured to remove ammonia from the airflow traveling through sorbent system 200. Sorbent housing 205 may be configured to receive a flow rate of the airflow through it of between 0.1 and 30 cubic feet per minute (between 0.0028 and 0.85 cubic meters per minute), between 1 and 30 cubic feet per minute (between 0.028 and 0.85 cubic meters per minute), between 5 and 20 cubic feet per minute (between 0.14 and 0.57 cubic meters per minute), or between 10 and 20 cubic feet per minute (between 0.28 and 0.57 cubic meters per minute).

Figure 2:
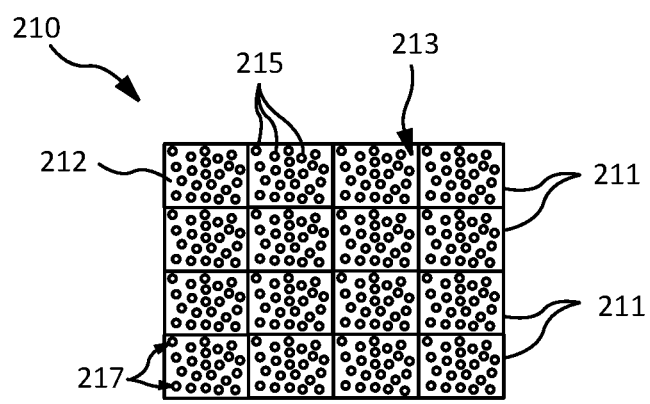
FIG. 2 illustrates a sorbent bed, in accordance with various embodiments.

In various embodiments, with combined reference to FIGS. 1 and 2, sorbent housing 205 may comprise a sorbent bed 210 disposed within. Sorbent bed 210 may comprise a sorbent support 212 and an impregnant 217. In various embodiments, sorbent support 212 may be comprised of any suitable support material such as a carbon material such as activated carbon, a polymeric material such as polymethyl methacrylate, and/or alumina. The support material may be comprised of particles 211. Particles 211 may be any suitable shape, but for simplicity, particles 211 are depicted as rectangles in FIG. 2. In various embodiments, the material of sorbent support 212 may be a porous material having pores 215. In various embodiments, sorbent support 212 may comprise, at a maximum, pores 215 having a pore volume between 0.1 and 0.6 cubic centimeter per cubic centimeter of support material, or between 0.3 and 0.6 cubic centimeters per cubic centimeter of support material. In various embodiments, sorbent support 212 may comprise pores 215 having a pore volume of about 0.5 cubic centimeter per cubic centimeter of support material. The term "about" as used in this context only, means plus or minus 0.1 cubic centimeter per cubic centimeter of support material.

In various embodiments, sorbent bed 210 may comprise a retention element 213, such as a retention screen, which may function to retain particles 211 of the support material in place. For example, for a carbon sorbent support 212, carbon particles may be applied to a retention element 213 to hold the carbon particles in place to form sorbent support 212 having a rectangular shape.

In various embodiments, the impregnant 217 comprised in sorbent bed 210 may be disposed within pores 215 of sorbent support 212. The impregnant 217 may comprise a suitable material to absorb ammonia in response to airflow comprising ammonia flowing through sorbent bed 210. In various embodiments, the impregnant 217 may comprise phosphoric acid ($H_3PO_4$) and/or a metal salt. In various embodiments, the metal salt may be zinc chloride ($ZnCl_2$). In various embodiments, sorbent bed 210 may comprise 20% to 60% by weight impregnant 217. In various embodiments, sorbent bed 210 may comprise 30% to 60% by weight impregnant 217, or 40% to 60% by weight impregnant 217. In various embodiments, sorbent bed 210 may comprise 50% to 60% by weight impregnant 217. The weight percent impregnant 217 may be calculated by dividing the mass of impregnant 217 in sorbent bed 210 by the mass of sorbent bed 210 (i.e., the impregnant 217 mass plus sorbent support 212 mass).

It has been shown that sorbent beds, such as sorbent bed 210, comprising 20% by weight impregnant or greater allows greater absorption of ammonia. Table 1 lists various sorbent beds with various weight percentages impregnant and the effectiveness of the sorbent beds at absorbing ammonia.

TABLE 1

| Sample | Sorbent Bed Material | Ammonia Loading Capacity |
| --- | --- | --- |
| A | Carbon w/10 wt % $H_3PO_4$ | 0.5% |
| B | Carbon w/17 wt % $H_3PO_4$ | 1.9% |
| C | Carbon w/54 wt % $ZnCl_2$ | 4.0% |
| D | Carbon w/57 wt % $H_3PO_4$ | 5.9% |

The various sorbent beds were tested using an inlet airflow comprising 50 parts per million ammonia, with relative humidity of less than 5%. The residence time (the amount of time that a gas particle spends flowing through the sorbent bed) was 0.14 second.

The ammonia loading capacity is the weight of ammonia absorbed divided by the weight of the sorbent bed (the sorbent support mass plus the impregnant mass). Therefore, the greater the ammonia loading capacity for a sorbent bed, the more effective the sorbent bed is at absorbing ammonia passing through it. As shown in Table 1, the sorbent bed materials in samples C and D have significantly greater weight percentages impregnant than the other samples. Additionally, samples C and D exhibited significantly greater ammonia loading capacities. Therefore, by having sorbent beds with greater weight percentages impregnant, smaller sorbent bed sizes may be required to absorb a desired amount of ammonia. By implementing sorbent beds comprising greater weight percentages impregnant (i.e., 20% weight impregnant or above) in a ventilation system, which are more efficient and effective at ammonia absorption than sorbent beds having lower weight percentages impregnant, more space can be allocated to other components of the ventilation system. This is especially advantageous in enclosed environments with limited space (i.e., a space vehicle or space suit).

Sorbent beds, such as samples A and B in Table 1, comprise less than 20% by weight impregnant for various reasons. Traditionally, sorbent beds are designed for the co-absorption of ammonia and organic contaminants in an air supply, such as n-butanol, ethanol, methanol, acetone, and acetaldehyde. Therefore, if an increased amount of impregnant configured to absorb ammonia is present in the sorbent bed (for instance, greater than the 17% present, as shown in sample B in Table 1), the capacity for the sorbent bed to absorb other organic contaminants decreases, which may be undesirable. Additionally, impregnants of sorbent beds configured to absorb ammonia (e.g., phosphoric acid and/or a metal salt) are hygroscopic, meaning they tend to absorb water. Therefore, as the weight percent of impregnant configured to absorb ammonia in the sorbent bed is increased, the more water will be absorbed by the sorbent bed. In environments within a ventilation system having higher relative humidity (i.e., above 60%, or above 50%), traditionally, sorbent beds with greater than 20% by weight impregnant configured to absorb ammonia (e.g., phosphoric acid and/or a metal salt) may absorb an undesirable amount of water because of their hygroscopic nature. Such absorption of water may cause condensation on the sorbent bed, resulting in water and dissolved phosphoric acid and/or metal salt dripping from the sorbent bed. In various embodiments, the metal salt impregnant may be zinc chloride.

In various embodiments, with reference to FIGS. 1 and 2, ventilation system 100 may comprise a relative humidity around sorbent system 200 within a range of 10% and 90%, 20% and 70%, 20% and 50%, or 30% and 40%. In various embodiments, as described herein, sorbent system 200 may be located downstream of dehumidifier 102 in ventilation system 100. Such a position of sorbent system 200 may allow the relative humidity around sorbent system 200 in ventilation system 100 to be below 50%, or below 40%, which may avoid the higher weight percent phosphoric acid and/or metal salt impregnant 217 (i.e., 20% to 60% by weight impregnant) from absorbing an undesirable amount of water, and causing acid and/or metal salt to leach out of sorbent support 212.

Figure 3:
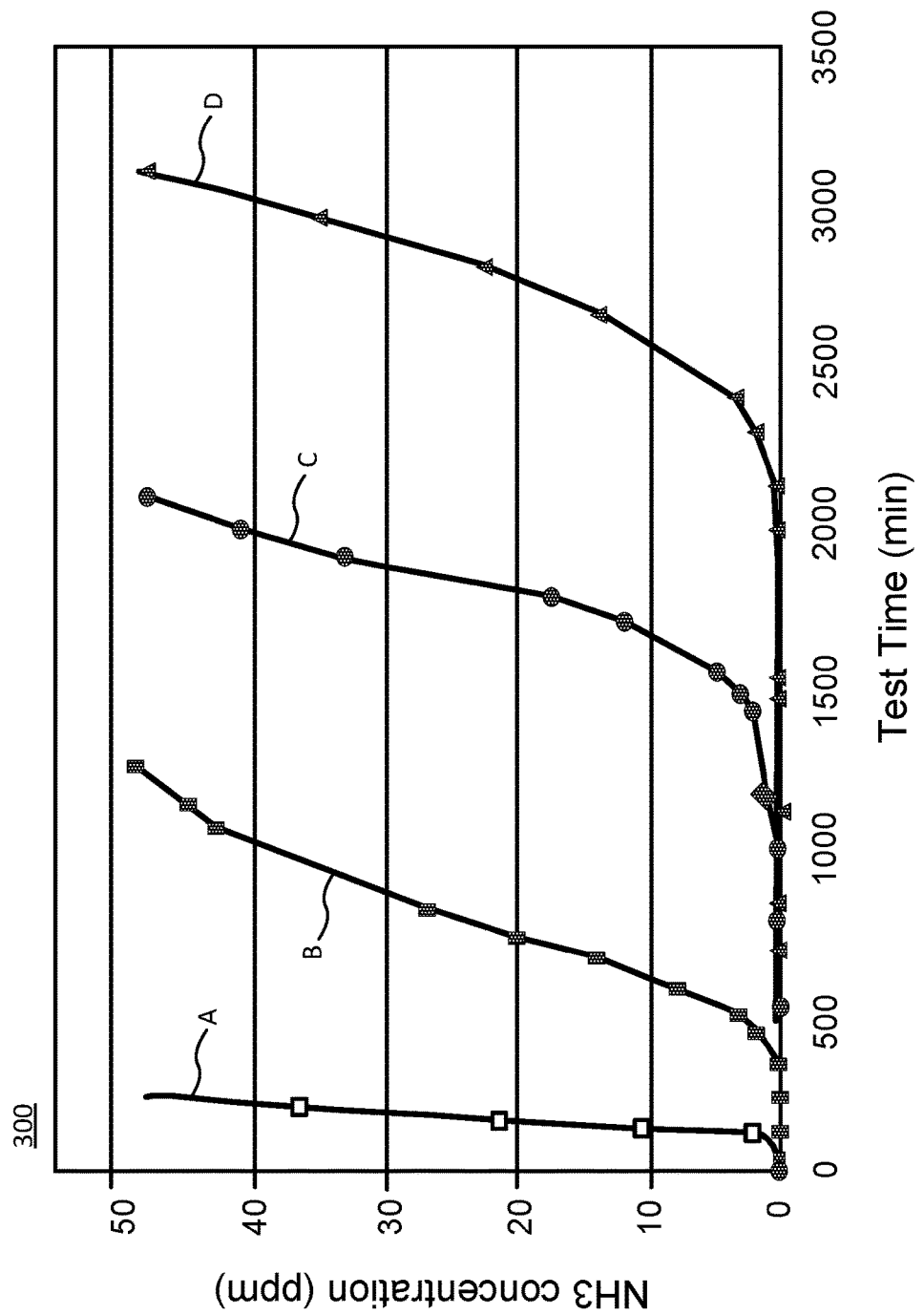
FIG. 3 illustrates a break-through chart for sorbent beds comprised of various materials, in accordance with various embodiments.

With reference to FIG. 3, plot 300 further demonstrates the effectiveness of sorbent beds having greater weight percentages impregnant, such as those comprised in samples C and D in Table 1. FIG. 3 depicts a break-through chart, which demonstrates how long a sorbent bed may be effective at absorbing ammonia. Time that the airflow comprising ammonia was applied through each sorbent bed is shown on the x-axis in plot 300, and concentration of ammonia in outlet airflow 110 (depicted in FIG. 1) is shown on the y-axis. The longer a sorbent bed is able to allow little or no break-through of ammonia, the better the sorbent bed is at absorbing and removing ammonia from the airflow. Samples A-D from Table 1 were tested and plotted, wherein the corresponding reference symbols (samples A-D) in plot 300 correspond to like-labeled samples in Table 1. As can be seen from plot 300, samples A and B, each having sorbent beds comprising less than 20% by weight impregnant, allowed greater break-through of ammonia significantly earlier in time than samples C and D, which have a higher weight percentage impregnant. Accordingly, these results indicate that sorbent beds comprising higher weight percentages impregnant are able to absorb more ammonia than those comprising lower weight percentages impregnant.

Figure 4:
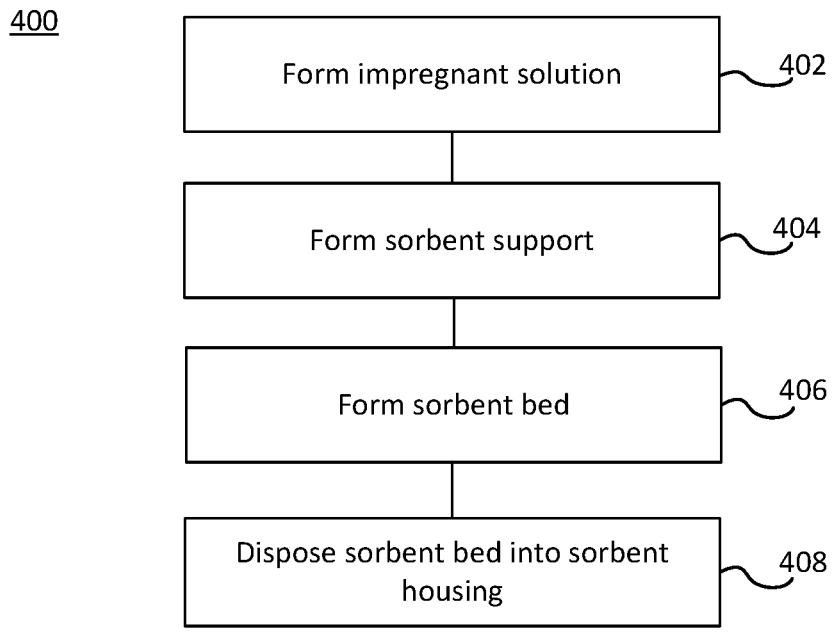
FIG. 4 illustrates a method for making a sorbent system, in accordance with various embodiments.

A method 400 of making a sorbent system, such as sorbent system 200 in FIG. 1, is depicted in FIG. 4, in accordance with various embodiments. In various embodiments, with combined reference to FIGS. 1, 2, and 4, an impregnant solution may be formed (step 402). An impregnant solution may comprise an impregnant 217 (e.g., phosphoric acid and/or a metal salt) and a solvent (e.g., water). The impregnant solution may be prepared with a desired concentration such that, in response to the solvent being evaporated after the impregnant solution has been applied to sorbent support 212, the resulting sorbent bed 210 may comprise between 20% and 60% by weight impregnant 217.

In various embodiments, sorbent support 212 may be formed (step 404) by disposing sorbent support particles 211 onto retention element 213. For example, retention element 213 may be a retention screen, and particles 211 of a sorbent support material (e.g., particles of activated carbon, a polymeric material, and/or alumina, for example) may be applied to retention element 213. Retention element 213 may provide a structure to hold particles 211 of the sorbent support material in a desired configuration to form sorbent support 212.

Figure 5:
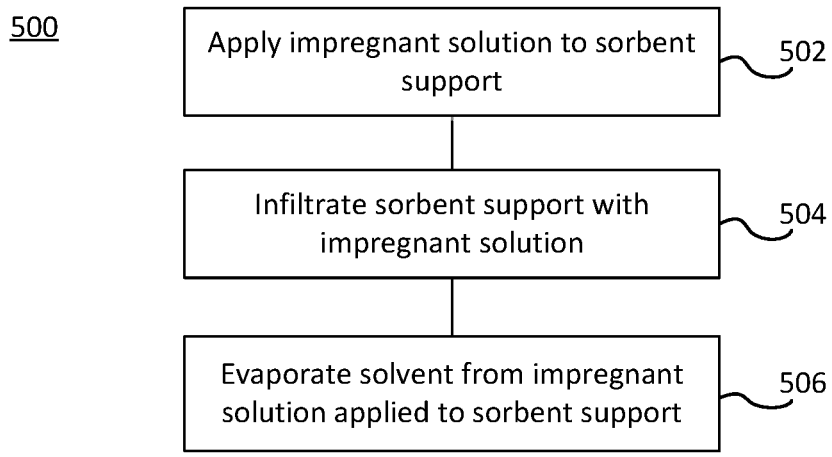
FIG. 5 illustrates a method for forming a sorbent bed, in accordance with various embodiments.

In various embodiments, sorbent bed 210 may be formed (step 406). In various embodiments, sorbent bed 210 may be formed by any suitable method, such as incipient wetness impregnation. With reference to FIG. 5, a method 500 of forming sorbent bed 210 is depicted, in accordance with various embodiments. The impregnant solution formed in step 402 may be applied to sorbent support 212 (step 502). For example, sorbent support 212 may be submerged in the impregnant solution for any suitable duration. In response, sorbent support 212 may be infiltrated with the impregnant solution (step 504) by the impregnant solution infiltrating pores 215 of sorbent support 212. Subsequently, the solvent may be evaporated from the impregnant solution applied to sorbent support 212 (step 506). The solvent may be evaporated from the impregnant solution on sorbent support 212 by heating, rotary evaporation, and/or placing sorbent support 212 with the impregnant solution under a vacuum. In various embodiments, steps 502-506 may occur simultaneously. In response to the solvent being evaporated from the impregnant solution on sorbent support 212, the resulting sorbent bed 210 may comprise between 20% and 60% by weight impregnant 217, between 30% and 60% by weight impregnant 217, between 40% and 60% by weight impregnant 217, or between 50% and 60% by weight impregnant 217.

Returning to FIGS. 1, 2, and 4, in response to sorbent bed 210 being formed, sorbent bed 210 may be disposed into a sorbent housing 205 (step 408) to form sorbent system 200. Sorbent system 200 may be disposed within ventilation system 100.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A sorbent bed, comprising:
   a sorbent support comprising at least one of a carbon material, a polymeric material, or alumina, wherein the sorbent support comprises a plurality of pores; and
   an impregnant configured to absorb ammonia disposed within the plurality of pores in the sorbent support, wherein the sorbent bed comprises greater than 50% and up to 60% by weight impregnant, and wherein the impregnant comprises at least one of phosphoric acid or zinc chloride.

2. The sorbent bed of claim 1, wherein the impregnant comprises zinc chloride.

3. The sorbent bed of claim 1, wherein the polymeric material is polymethyl methacrylate.

4. The sorbent bed of claim 1, further comprising a retention element upon which the sorbent support is disposed.

5. A ventilation system, comprising:
   a dehumidifier;
   a sorbent system downstream of the dehumidifier, the sorbent system comprising a sorbent housing and a sorbent bed disposed within the sorbent housing,
   wherein the sorbent housing comprises an inlet and an outlet for an airflow through the sorbent housing,
   wherein the sorbent bed comprises a sorbent support and an impregnant configured to absorb ammonia, the sorbent support comprising at least one of a carbon material, a polymeric material, or alumina, wherein the sorbent support comprises a plurality of pores and the impregnant is disposed within the plurality of pores, and
   wherein the sorbent bed comprises greater than 50% and up to 60% by weight impregnant, and wherein the impregnant comprises at least one of phosphoric acid or zinc chloride.

6. The ventilation system of claim 5, wherein a relative humidity around the sorbent system is below 50%.

7. The ventilation system of claim 5, wherein the impregnant comprises zinc chloride.

8. The ventilation system of claim 5, wherein the polymeric material is polymethyl methacrylate.

9. The ventilation system of claim 5, wherein the sorbent bed further comprises a retention element upon which the sorbent support is disposed.

10. The ventilation system of claim 5, wherein the sorbent housing is configured to receive a flowrate between 0.1 and 30 cubic feet per minute.

11. A method for making a sorbent system, comprising:
    forming an impregnant solution comprising a solvent and an impregnant configured to absorb ammonia; and
    forming a sorbent bed by applying the impregnant solution to a sorbent support, infiltrating a plurality of pores comprised in the sorbent support with the impregnant solution, and evaporating the solvent from the impregnant solution applied to the sorbent support leaving the impregnant in the plurality of pores, wherein the sorbent support comprises at least one of a carbon material, a polymeric material, or alumina,
    wherein the sorbent bed comprises greater than 50% and up to 60% by weight impregnant after the evaporating the solvent, wherein the impregnant comprises at least one of phosphoric acid or zinc chloride.

12. The method of claim 11, further comprising forming the sorbent support by applying support particles to a retention element.

13. The method of claim 11, further comprising disposing the sorbent bed into a sorbent housing after the evaporating the solvent.

* * * * *